US012415760B2

(12) United States Patent
Komatsu et al.

(10) Patent No.: US 12,415,760 B2
(45) Date of Patent: Sep. 16, 2025

(54) ZINC OXIDE ELEMENT

(71) Applicant: MEIDENSHA CORPORATION, Tokyo (JP)

(72) Inventors: Yuya Komatsu, Tokyo (JP); Atsushi Seki, Tokyo (JP); Masayuki Takada, Tokyo (JP); Yukio Tagami, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/848,084

(22) PCT Filed: Mar. 8, 2023

(86) PCT No.: PCT/JP2023/008714
§ 371 (c)(1),
(2) Date: Sep. 17, 2024

(87) PCT Pub. No.: WO2023/176608
PCT Pub. Date: Sep. 21, 2023

(65) Prior Publication Data
US 2025/0109073 A1     Apr. 3, 2025

(30) Foreign Application Priority Data
Mar. 18, 2022   (JP) ................. 2022-043992

(51) Int. Cl.
*C04B 35/453*   (2006.01)
*C04B 35/64*    (2006.01)
(Continued)

(52) U.S. Cl.
CPC .......... *C04B 35/453* (2013.01); *C04B 35/64* (2013.01); *H01C 7/12* (2013.01);
(Continued)

(58) Field of Classification Search
CPC .......... H01C 7/12; H01C 7/112; C04B 35/453; C04B 35/64; C04B 2235/3284;
(Continued)

(56) References Cited

U.S. PATENT DOCUMENTS 5,739,742 A     4/1998   Iga et al.
6,362,720 B1    3/2002   Kaneko et al.
(Continued)

FOREIGN PATENT DOCUMENTS

CN     1165125 A    11/1997
CN     1988064 A     6/2007
(Continued)

OTHER PUBLICATIONS

Bin, Tang et al., "Study and Industrialization on High Performance Low Voltage ZnO Varistor", 2012, retrieved from https://www.cnki.net.
(Continued)

*Primary Examiner* — C Melissa Koslow
(74) *Attorney, Agent, or Firm* — Foley & Lardner LLP

(57) ABSTRACT

Provided is a zinc oxide element which does not contain antimony oxide and has good nonlinear resistance characteristics (V10 kA/V1 mA nonlinearity) by controlling the particle size of zinc oxide particles in a sintered body. The zinc oxide element of the present invention includes a fired body containing zinc oxide, bismuth oxide, and zinc stannate ($Zn_2SO_4$). A method for producing a zinc oxide element of the present invention includes firing a raw material oxide that contains zinc oxide, bismuth oxide, and tin oxide and does not contain antimony oxide, and segregating zinc stannate ($Zn_2SO_4$) at grain boundaries of the fired zinc oxide.

8 Claims, 5 Drawing Sheets

(51) Int. Cl.
*H01C 7/112* (2006.01)
*H01C 7/12* (2006.01)

(52) U.S. Cl.
CPC ............... *C04B 2235/3224* (2013.01); *C04B 2235/3225* (2013.01); *C04B 2235/3241* (2013.01); *C04B 2235/3262* (2013.01); *C04B 2235/3275* (2013.01); *C04B 2235/3279* (2013.01); *C04B 2235/3284* (2013.01); *C04B 2235/3291* (2013.01); *C04B 2235/3293* (2013.01); *C04B 2235/3298* (2013.01); *C04B 2235/3409* (2013.01); *C04B 2235/3418* (2013.01); *C04B 2235/85* (2013.01); *H01C 7/112* (2013.01)

(58) Field of Classification Search
CPC .... C04B 2235/3293; C04B 2235/3298; C04B 2235/3224; C04B 2235/3225; C04B 2235/3241; C04B 2235/3262; C04B 2235/3275; C04B 2235/3279; C04B 2235/3291; C04B 2235/3409; C04B 2235/3418; C04B 2235/85
See application file for complete search history.

(56) References Cited

U.S. PATENT DOCUMENTS

| | | | |
|---|---|---|---|
| 6,627,119 | B2 | 9/2003 | Kaneko et al. |
| 2002/0075124 | A1* | 6/2002 | Kaneko ............... C04B 35/453 338/21 |
| 2021/0206697 | A1* | 7/2021 | Ozawa ............... H01B 13/34 |

FOREIGN PATENT DOCUMENTS

| | | |
|---|---|---|
| CN | 101752046 A | 6/2010 |
| JP | S61-043404 A | 3/1986 |
| JP | H09-312203 A | 12/1997 |
| JP | H10-229003 A | 8/1998 |
| JP | 2010-238882 A | 10/2010 |
| JP | 2011-171665 A | 9/2011 |
| JP | 5065688 B2 | 11/2012 |

OTHER PUBLICATIONS

Yang, Ming-zhu et al., "Effect of Sn Doping on the Electrical Properties of ZnO Varistor", Bulletin of The Chinese Ceramic Society, China Academic Journal Electronic Publishing House, vol. 32, No. 1, Jan. 2013.

* cited by examiner

ZINC OXIDE ELEMENT

TECHNICAL FIELD

The present invention relates to a zinc oxide element used for an overvoltage protection device such as a lightning arrester, and particularly to a zinc oxide element using tin oxide instead of antimony oxide as a raw material oxide.

BACKGROUND ART

Zinc oxide lightning arresters are widely used for suppressing overvoltage due to lightning stroke surge or the like to transmission and distribution lines and transformation facilities, or as protection devices for various power apparatus such as transformers. As an internal element of a zinc oxide lightning arrester, a sintered body is used which is prepared by mixing zinc oxide powder as a main component with several types of oxides as additives, for example, bismuth(III) oxide, antimony(III) oxide, cobalt(III) oxide, nickel(II) oxide, manganese dioxide ($MnO_2$) and the like, pressure-molding the mixture into a cylindrical shape or the like using an organic binder such as polyvinyl alcohol, and then firing the molded mixture at a high temperature of 1000° C. or higher. Various developments have been made since electrical characteristics can be improved by changing the components and additives of the zinc oxide element and controlling the composition and particle size of the sintered body constituent particles.

On the other hand, in recent years, the demand for power transmission cost has become severer, and downsizing of transmission and transformation facilities is strongly desired in order to reduce the power transmission cost. For this reason, downsizing of an overvoltage protection device for determining an insulation level of a transformation device is urgently required. A current-voltage nonlinear resistor adopted in an overvoltage protection device exhibits almost an insulation characteristic under a normal voltage, but has nonlinear resistance characteristics exhibiting a low resistance characteristic when an abnormal voltage is applied, and is effective for suppressing overvoltage. Therefore, the current-voltage nonlinear resistor is a protection level itself in the overvoltage protection device, and is an extremely important technical element that affects downsizing of the overvoltage protection device, eventually, downsizing of the transmission and transformation facilities. Therefore, various current-voltage nonlinear resistors to which various improvements have been made by limiting constituent components have been proposed.

Patent Literature 1 discloses a current-voltage nonlinear resistor that is excellent in current-voltage nonlinear characteristics, life characteristics, and surge energy resistance after being downsized by adjusting the content of accessory components, and is capable of contributing to downsizing of an overvoltage protection device by reducing the degree of decrease in the resistance value when the temperature of the current-voltage nonlinear resistor rises, that is, by improving thermal stability at a high temperature. It is also described that by containing 0.5 to 2.5 mol % of antimony oxide ($Sb_2O_3$) as an accessory component, zinc oxide and spinel particles are formed to suppress grain growth of the sintered body, and the nonlinear resistance characteristics are improved by the function of making the particles uniform.

CITATION LIST

Patent Literature

Patent Literature 1: JP 5065688 B1

SUMMARY OF INVENTION

Technical Problem

As an element used in an overvoltage protection device or the like, it is required to provide an element that does not contain antimony oxide which requires health and environmental consideration. However, in the case of an element that does not contain antimony oxide, it tends to be difficult to maintain the above-described nonlinear resistance characteristics.

Under such a background, an object of the present invention is to provide a zinc oxide element which avoids health and environmental problems due to the use of antimony oxide, controls the particle size of zinc oxide particles in a fired body, and has good nonlinear resistance characteristics (V10 kA/V1 mA nonlinearity).

Solution to Problem

As a result of intensive studies to solve the above problems, the present inventors have found that by using tin oxide ($SnO_2$) instead of antimony oxide ($Sb_2O_3$), the particle size of zinc oxide particles in a fired body can be controlled, whereby a zinc oxide element having good nonlinear resistance characteristics can be obtained, and have completed the present invention.

That is, a preferred aspect of the present invention is a zinc oxide element having the following configuration and a method for producing the same.

[1] A zinc oxide element including a fired body containing zinc oxide (ZnO), bismuth oxide ($Bi_2O_3$), and zinc stannate ($Zn_2SnO_4$).

[2] The zinc oxide element according to [1], in which the amount of zinc stannate in the fired body is 0.1 to 5 mol % when the total amount of metal elements in the fired body is 100 mol %.

[3] The zinc oxide element according to [1] or [2], in which in an arbitrary cross section of the fired body, a value obtained by dividing a standard deviation ($\sigma$) based on a distribution of cross-sectional areas of zinc oxide particles by an average particle diameter (D) of the zinc oxide particles ($\sigma/D$) is 0.4 or less.

[4] The zinc oxide element according to any one of [1] to [3], in which the fired body further contains tin oxide.

[5] The zinc oxide element according to any one of [1] to [4], in which the fired body does not contain antimony oxide ($Sb_2O_3$).

[6] The zinc oxide element according to any one of [1] to [5], in which the fired body further contains at least one oxide compound selected from the group consisting of cobalt oxide ($Co_2O_3$), nickel oxide (NiO), manganese oxide (MnO), chromium oxide ($Cr_2O_3$), silver oxide ($Ag_2O$), silicon oxide ($SiO_2$), and boron oxide ($B_2O_3$).

[7] The zinc oxide element according to any one of [1] to [6], in which the fired body further contains an oxide of at least one rare earth element selected from the group consisting of yttrium (Y), europium (Eu), erbium (Er), thulium (Tm), gadolinium (Gd), dysprosium (Dy), holmium (Ho), and ytterbium (Yb).

[8] A method for producing a zinc oxide element, including firing a raw material oxide that contains zinc oxide (ZnO), bismuth oxide ($Bi_2O_3$), and tin oxide ($SnO_2$) and does not contain antimony oxide ($Sb_2O_3$), and segregating zinc stannate ($Zn_2SnO_4$) at grain boundaries of the fired zinc oxide

[9] The production method according to [8], in which the raw material oxide further contains at least one oxide compound selected from the group consisting of cobalt oxide ($Co_2O_3$), nickel oxide (NiO), manganese oxide (MnO), chromium oxide ($Cr_2O_3$), silver oxide ($Ag_2O$), silicon oxide ($SiO_2$), and boron oxide ($B_2O_3$).

[10] The production method according to [8] or [9], in which the raw material oxide further contains an oxide of at least one rare earth element selected from the group consisting of yttrium (Y), europium (Eu), erbium (Er), thulium (Tm), gadolinium (Gd), dysprosium (Dy), holmium (Ho), and ytterbium (Yb).

Advantageous Effects of Invention

According to the present invention, zinc stannate ($Zn_2SnO_4$) segregates at grain boundaries of fired zinc oxide without using antimony oxide, whereby a zinc oxide element excellent in nonlinear resistance characteristics and thermal stability can be obtained.

DESCRIPTION OF EMBODIMENTS

Figure 1:
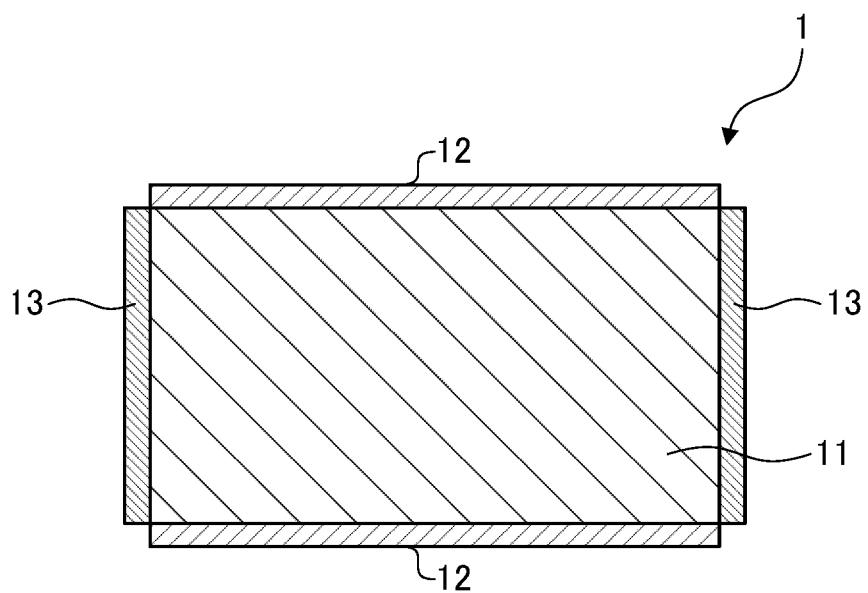
FIG. 1 is a cross-sectional view showing an example of a zinc oxide element of the present invention.

In the present specification, the symbol "mA" represents milliamperes, "KA" represents kiloamperes, "V" represents volt, "kV" represents kilovolt, and "w" represents watt. In addition, "mm" represents millimeters, "μm" represents micrometers, and "μs" represents microseconds. In the present specification, "antimony oxide" is synonymous with "antimony(III) oxide", "bismuth oxide" is synonymous with "bismuth(III) oxide", "cobalt oxide" is synonymous with "cobalt(III) oxide", "nickel oxide" is synonymous with "nickel(II) oxide", and "manganese oxide" is synonymous with "manganese(II) oxide".

The zinc oxide element of the present invention includes a fired body containing zinc oxide (ZnO), bismuth oxide ($Bi_2O_3$), and zinc stannate ($Zn_2SO_4$). In the present invention, tin oxide ($SnO_2$) is used instead of antimony oxide ($Sb_2O_3$) which is generally used as a raw material oxide. In the present invention, the fired body is obtained by firing tin oxide together with zinc oxide, bismuth oxide, or the like. Zinc stannate is produced by zinc oxide and tin oxide forming spinel particles during firing, and segregates at grain boundaries of zinc oxide. Part or all of tin oxide is converted into zinc stannate by firing. Therefore, the zinc oxide element of the present invention may contain tin oxide ($SnO_2$) derived from a raw material oxide. The present inventors have surprisingly found that zinc stannate produced by addition of tin oxide suppresses the growth of zinc oxide particles in a fired body, and zinc oxide particles having a uniform and small particle size are obtained, whereby a zinc oxide element having good nonlinear resistance characteristics (V10 kA/V1 mA nonlinearity) is obtained.

The contents of zinc oxide, bismuth oxide, and tin oxide in the raw material oxide are preferably 90 to 99.4 mol %, 0.3 to 1 mol %, and 0.1 to 5 mol %, respectively, when the total amount of metal elements is 100 mol %. Also, the content of zinc stannate produced in the fired body is preferably 0.1 to 5 mol %, 0.1 to 2.5 mol %, or 0.1 to 1 mol %.

Bismuth oxide contained in the zinc oxide element segregates at the grain boundaries of zinc oxide of the fired body, thereby forming a high-resistance grain boundary, and the nonlinear resistance characteristics of the zinc oxide element are exhibited. Moreover, bismuth oxide is known to promote densification of fired body even at a relatively low firing temperature. In the conventional zinc oxide element, antimony oxide is generally added for the purpose of improving nonlinear resistance characteristics and the like, but the zinc oxide element of the present invention preferably does not contain antimony oxide in the zinc oxide element. In the present invention, "does not contain" antimony oxide means that the content of antimony oxide in the zinc oxide element is equal to or less than the detection limit, or 0.1 mol % or less.

The fired body constituting the zinc oxide element of the present invention may contain an oxide compound such as cobalt oxide ($Co_2O_3$), nickel oxide (NiO), manganese oxide (MnO), chromium oxide ($Cr_2O_3$), silver oxide ($Ag_2O$), silicon oxide ($SiO_2$), or boron oxide ($B_2O_3$) as an accessory component, in addition to the zinc oxide, bismuth oxide, zinc stannate, and tin oxide described above. It is known that an oxide compound is solid-solved in zinc oxide crystal particles in a firing step. The metal in the oxide compound that solid-solves as described above functions as a donor, the free electron density of the zinc oxide crystal particles becomes higher, the resistance value of the zinc oxide crystal particles themselves decreases, and the rise of the voltage in the overcurrent range tends to be suppressed to a low level. Therefore, the zinc oxide element preferably contains the oxide compound in addition to bismuth oxide. Among them, cobalt oxide, manganese oxide, nickel oxide, chromium oxide, and silicon oxide are particularly preferable from the viewpoint of easily obtaining good current nonlinear characteristics and discharge withstand characteristics.

The content of the oxide compound in the fired body of the zinc oxide element is each preferably 0.01 to 7.0 mol %, more preferably 0.05 to 6.0 mol %, and still more preferably 0.1 to 5.0 mol % (mol % means mol % of the metal element of each oxide compound when the total amount of metal elements is 100 mol %) in terms of metal element. The phrase "when the total amount of metal elements is 100 mol %" means that the total amount of metal elements including metalloids such as Si and B is 100 mol %.

The fired body of the zinc oxide element may optionally contain other additives. For example, a rare earth oxide may be contained for the purpose of, for example, increasing the resistance of the zinc oxide element. As the rare earth oxide, for example, an oxide ($R_2O_3$) of at least one rare earth element (R) such as yttrium (Y), europium (Eu), erbium (Er), thulium (Tm), gadolinium (Gd), dysprosium (Dy), holmium (Ho), or ytterbium (Yb) may be contained. The content of the rare earth oxide in the fired body of the zinc oxide element is each preferably 0.01 to 5.0 mol % and more preferably 0.1 to 1.0 mol % (mol % means mol % of the metal element of each rare earth oxide when the total amount of metal elements is 100 mol %) in terms of metal element.

Next, a method for producing the zinc oxide element of the present invention will be described. As the raw material oxide, zinc oxide, bismuth oxide, and tin oxide, and if necessary, the oxide compound, the rare earth oxide, and the like are charged into a mixing and pulverizing apparatus together with an organic binder and the like, and pulverized and mixed for a predetermined time to prepare a slurry. The organic binder used in the present invention is not particularly limited, and for example, polyvinyl alcohol (PVA) or the like can be used. The prepared slurry is sprayed and granulated by, for example, a rotary disc method or a pressure nozzle method to prepare granulated powder. The obtained granulated powder is filled in a mold and pressure-molded into a cylindrical shape or the like by, for example, a hydraulic press forming machine or the like to prepare a molded body.

The prepared molded body is subjected to binder removal by firing while being maintained at a temperature of 400 to 950° C. for 1 to 3 hours in the atmosphere, and fired while being maintained at a temperature of 1000 to 1300° C. for 1 to 15 hours to prepare a fired body. In the step after molding, the side surface of the fired body is coated or sprayed with an inorganic insulator (glass fit or the like) and then heated at 480 to 650° C. to form an insulating layer. Further, upper and lower surfaces of the fired body may be polished, and a conductive material (aluminum, silver, or the like) may be thermally sprayed on the polished surface to form an electrode.

In a preferred embodiment, the method for producing the zinc oxide element of the present invention includes the following steps.

(Blending Step)

The raw material oxide contains an oxide compound of zinc oxide as a main component, bismuth oxide (0.3 to 1 mol %), tin oxide (0.1 to 5 mol %), cobalt oxide (0.3 to 1.5 mol %), manganese oxide (0.2 to 2 mol %), and nickel oxide (0.5 to 3 mol %) [mol % represents mol % of the metal element of each of the oxide compounds when the total amount of metal elements (including metalloids) is 100 mol %], and silver oxide (0.005 to 0.05 wt %), and boron oxide (0.005 to 0.05 wt %) [wt % represents wt % of the metal or metalloid element of each of the oxide compounds when the total amount of metal elements (including metalloids) is 100 wt %] as accessory components. As the raw material oxide, a raw material oxide that is tightly sealed and stored, and managed so as not to be mixed with impurities is used.

(Pulverization Step)

As raw material oxide excluding zinc oxide, bismuth oxide, tin oxide, cobalt oxide, manganese oxide, nickel oxide, silver oxide, and boron oxide are fractionated in the above mixing ratio in any order, and then placed in a ball mill container together with pure water in an amount equal to the total amount of the raw material oxides in terms of weight ratio, and pulverized using zirconia balls with a diameter of 3 mm while changing the pulverization time such that the particle size D50 of the pulverized slurry is approximately 0.7 μm or less. The particle size of the pulverized slurry is a particle size measured using a laser diffraction particle size analyzer.

(Granulation/Molding Step)

The pulverized slurry is sufficiently mixed together with zinc oxide of 90 mol % or more in terms of metal element, water, an organic binder of 1 wt % with respect to the weight of zinc oxide, and an aluminum nitrate ($Al(NO_3)_3 \cdot 9H_2O$) aqueous solution (corresponding to 10 to 30 ppm by weight as $Al^{3+}$ ions), and then granulated with a spray dryer or the like, and the obtained granulated granules are uniaxially molded using a mold with a diameter of 51.9 mm so as to be within a density in a range of 2.5 to 3.50 g/cm³.

(Calcination Step)

The obtained molded body is subjected to calcination under the condition of being held at a maximum holding temperature of 800 to 950° C. for 3 to 20 hours. At that time, the organic binder added is removed by holding at 350 to 700° C.

(Firing Step)

The obtained calcined body is allowed to stand in a sagger made of alumina or the like, and fired under the conditions of a maximum holding temperature of 1000 to 1200° C., a holding time of 1 to 15 hours, a temperature raising rate of 10 to 70° C./hour, and a temperature lowering rate of 10 to 70° C./hour. The firing step has a descending inflection point of 700 to 950° C., and the temperature is lowered at 70 to 100° C./hour in the subsequent sections.

(Side Surface Insulation Treatment Step)

An amount 0.5 to 3.0 g of a side insulating layer slurry composed of bismuth glass, a filler for thermal expansion adjustment, and an organic binder is spray-coated on the obtained fired body side surface, and subjected to heat treatment under heat treatment conditions of a maximum holding temperature of 450 to 600° C. and a holding time of 0.5 to 3.0 hours to provide an insulating layer on the fired body side surface. At this time, the organic binder added is removed by holding at 350° C. for 1 to 3 hours.

(Polishing/Electrode Attachment Step)

After both upper and lower end surfaces of the heat-treated body provided with the insulating layer are polished, an aluminum electrode is thermally sprayed on the polished surface. The configuration of the finished element is shown in FIG. 1. FIG. 1 is a cross-sectional view of a zinc oxide element 1, in which an insulating layer 13 is provided on a side surface of a fired body 11, and electrodes 12 are provided on upper and lower end surfaces of the fired body 11.

(Operation and Effect)

Figure 4:
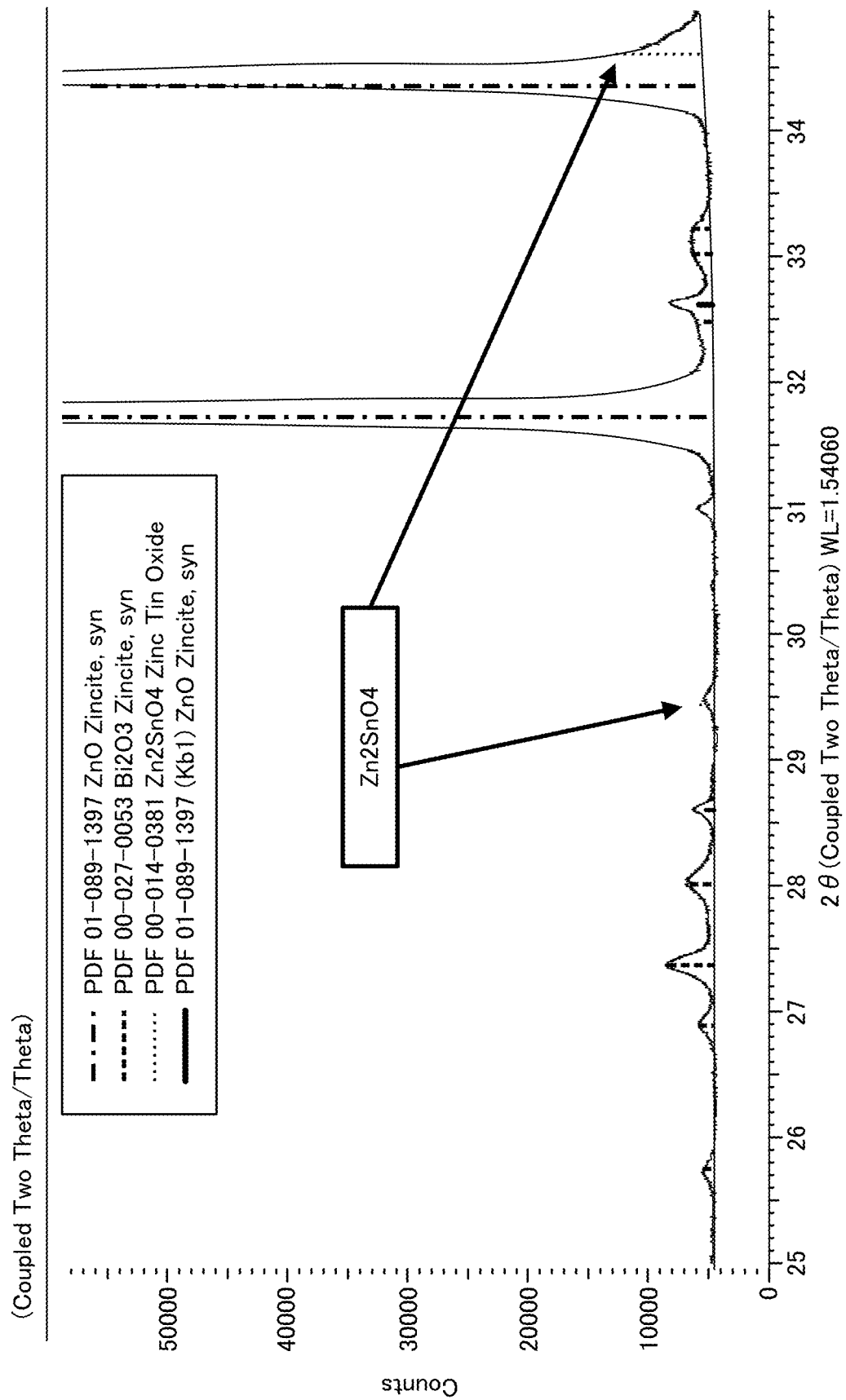
FIG. 4 is an X-ray diffraction graph showing diffraction peaks of oxides constituting the zinc oxide element of the present invention.

In the zinc oxide element of the present invention, antimony oxide is not used as an element raw material, and tin oxide is used as a substitute material for antimony oxide, and then the conditions for pulverizing the oxide compound as an accessory component, the firing conditions, and the heat treatment conditions are appropriately selected, whereby a nonlinear resistor excellent in nonlinear resistance characteristics and thermal stability can be obtained. That is, by using tin oxide as an element raw material, tin oxide during firing forms spinel particles $Zn_2SnO_4$ (FIGS. 2 and 4) at a zinc oxide grain boundary, and grain growth of zinc oxide particles in the fired body is suppressed. As a result, the particle size of zinc oxide is made uniform, and the value obtained by dividing the standard deviation (σ) based on the distribution of cross-sectional areas of zinc oxide particles by the average particle diameter (D) of zinc oxide particles (σ/D) is suppressed to 0.4 or less, and preferably 0.3 or less. As the current distribution in the element is made uniform due to this, the nonlinear resistance characteristics can be improved. For the nonlinear resistance characteristics, the ratio of an operation starting voltage (V1 mA) to a voltage when an 8×20 μs impulse current of 10 kA is passed (V10 kA) (V10 kA/V1 mA) is evaluated as a nonlinearity coefficient. In the element of the present invention, a value of 1.8 or less is obtained.

EXAMPLES

The present invention will be described in more detail by the following examples. However, the examples are illustrative for describing the present invention, and the present invention is not limited to the invention described in these examples.

(Performance Evaluation of Zinc Oxide Particles)

The operation starting voltage (voltage when 1 mA of alternating current is passed, V1 mA) of the prepared zinc oxide element is measured. Next, the voltage when an 8×20 μs impulse current of 10 kA is passed (V10 kA) is measured, and the ratio to the operation starting voltage (V1 mA) (V10 kA/V1 mA) is evaluated as a nonlinearity coefficient. The smaller the value of the nonlinearity coefficient, the better the nonlinear resistance characteristics. In addition, as the evaluation of thermal stability, the Watt loss value when an AC voltage of 80% of the operation starting voltage is applied is measured using a thermostatic chamber at 170° C. The smaller the Watt loss value at 170° C., the more excellent the thermal stability.

(Measurement of Standard Deviation (σ) Based on Distribution of Cross-Sectional Areas of Zinc Oxide Particles/Average Particle Diameter (D) of Zinc Oxide Particles)

Figure 5:
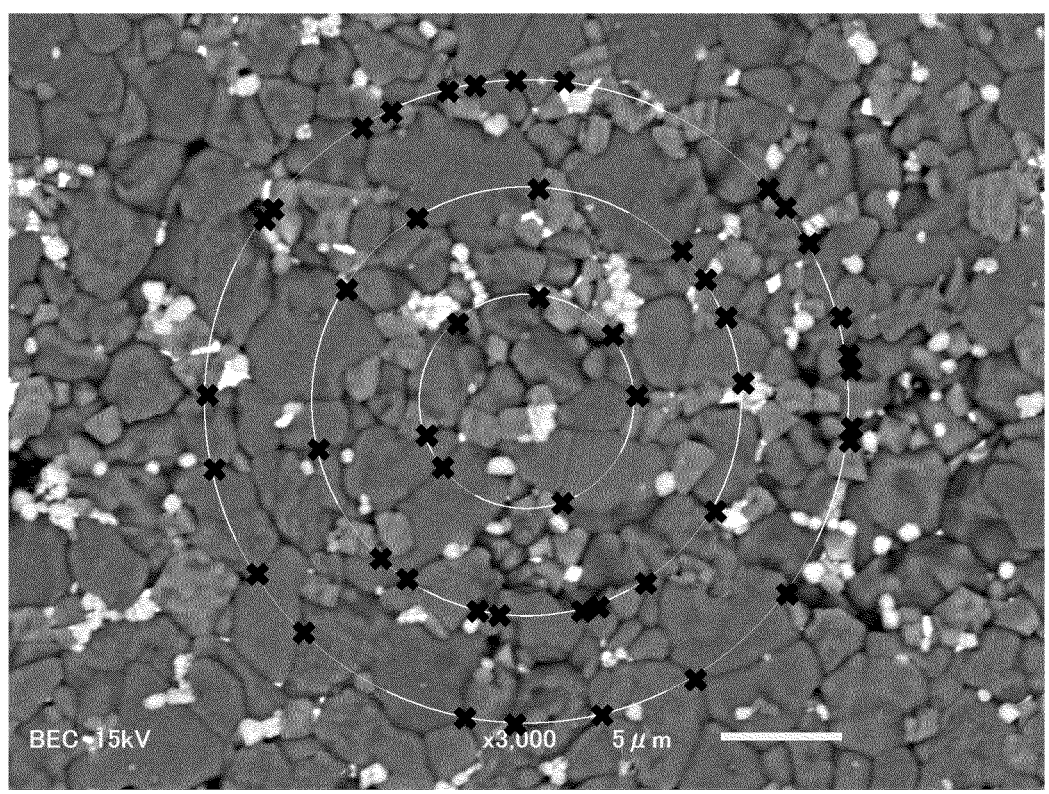
FIG. 5 is a scanning electron micrograph in which concentric circles are drawn on a cross section of the zinc oxide element of the present invention in order to measure the average particle diameter and standard deviation of zinc oxide particles in the zinc oxide element. A cross mark on the circumference of the concentric circle indicates a grain boundary.

The average particle diameter (D) of zinc oxide particles and the standard deviation (σ) are measured by an intercept method. First, an arbitrary cross section of the fired body is cut out, and the cut cross section is mirror-polished. Subsequently, in order to make it easy to identify the particles, thermal etching is performed in an electric furnace or the like to prepare an observation surface in which a zinc oxide grain boundary is emphasized. Next, a reflected electron image is acquired with a scanning electron microscope, three concentric circles with a constant total circumferential length are drawn at the center of the image as shown in FIG. 5, and then the average particle diameter (D) of zinc oxide particles and the standard deviation (σ) based on the distribution of cross-sectional areas are measured. For each evaluation, an arithmetic mean value of the average particle diameter and standard deviation of 15 arbitrary observation visual fields is used. The average particle diameter D of zinc oxide particles is calculated from D=L/n (L represents a concentric circumferential length, and n represents the number of zinc oxide grain boundaries). The value of σ/D is obtained by dividing the standard deviation (σ) calculated by the above measurement by the average particle diameter (D).

Example 1

Raw material oxides composed of zinc oxide as a main component, bismuth oxide, tin oxide, cobalt oxide, manganese oxide, and nickel oxide, and silver oxide and boron oxide as accessory components were prepared, and the respective components were weighed so that bismuth oxide was 0.3 to 0.7 mol %, tin oxide was 0.60 mol %, cobalt oxide was 0.3 to 1.0 mol %, manganese oxide was 0.2 to 1.0 mol %, and nickel oxide was 0.5 to 1.5 mol % [mol % represents mol % of the metal element of each of the oxide compounds when the total amount of metal elements (including metalloids) is 100 mol %], and silver oxide was 0.01 to 0.05 wt %, and boron oxide was 0.005 to 0.03 wt % [wt % represents wt % of the metal or metalloid element of each of the oxide compounds when the total amount of metal elements (including metalloids) is 100 wt %]. The weighed raw material oxide excluding zinc oxide was placed in a ball mill container together with pure water in an amount equal to the total amount of the raw material oxides in terms of weight ratio, and pulverized using zirconia balls with a diameter of 3 mm. The raw material oxide was pulverized so that the particle size D50 of the pulverized slurry was approximately 0.7 μm or less when measured using a laser diffraction particle size analyzer. The pulverized slurry was sufficiently mixed together with zinc oxide of 90 mol % or more in terms of metal element, water, an organic binder (PVA) of 1 wt % with respect to the weight of zinc oxide, and an aluminum nitrate ($Al(NO_3)_3 \cdot 9H_2O$) aqueous solution (corresponding to 10 to 30 ppm by weight as $Al^{3+}$ ions), and then granulated with a spray dryer or the like, and uniaxially molded using a mold with a diameter of 51.9 mm.

The prepared molded body was calcined at a maximum holding temperature of 800 to 950° C. for 3 to 20 hours. At that time, the organic binder added was removed by holding at 350 to 700° C. The obtained calcined body was allowed to stand in a sagger and fired under the conditions of a maximum holding temperature of 1000 to 1100° C., a holding time of 1 to 10 hours, a temperature raising rate of 20 to 70° C./hour, and a temperature lowering rate of 20 to 70° C./hour. An amount 0.5 to 3.0 g of a side insulating layer slurry composed of bismuth glass, a filler for thermal expansion adjustment, and an organic binder was spray-coated on the obtained fired body side surface, and then subjected to heat treatment under heat treatment conditions of a maximum holding temperature of 450 to 600° C. and a holding time of 0.5 to 3.0 hours to provide an insulating layer on the fired body side surface. After both upper and lower end surfaces of the heat-treated body provided with the insulating layer were polished, an aluminum electrode was thermally sprayed on the polished surface. The electrical performance of the obtained zinc oxide element is shown in Table 1, and the average particle diameter of zinc oxide particles and σ/D are shown in Table 2.

Comparative Example 1

A zinc oxide element was prepared under the same conditions as in Example 1 except that tin oxide (0.60 mol %) contained in the raw material oxide was replaced with antimony oxide (0.53 mol %). The electrical performance of the obtained zinc oxide element is shown in Table 1, and the average particle diameter of zinc oxide particles and σ/D are shown in Table 2.

Comparative Example 2

A zinc oxide element was prepared under the same conditions as in Example 1 except that neither tin oxide nor antimony oxide was added to the raw material oxide. The electrical performance of the obtained zinc oxide element is shown in Table 1, and the average particle diameter of zinc oxide particles and σ/D are shown in Table 2.

TABLE 1

| Example No. | Raw material oxide | | Electrical performance | | |
|---|---|---|---|---|---|
| | Antimony oxide mol % | Tin oxide mol % | Operation starting voltage V1 mA V/mm | Nonlinearity V10 kA/V1 mA | High temperature watt loss [W/kV] |
| Comparative Example 1 | 0.53 | 0 | 218 | 1.770 | 0.50 |
| Comparative Example 2 | 0 | 0 | 95 | 2.150 | 0.85 |
| Example 1 | 0 | 0.60 | 167 | 1.760 | 0.74 |

TABLE 2

| | Average particle diameter D [μm] | Standard deviation σ [μm] | σ/D |
|---|---|---|---|
| Comparative Example 1 | 4.59 | 1.02 | 0.22 |
| Comparative Example 2 | 6.19 | 5.61 | 0.91 |
| Example 1 | 5.49 | 1.45 | 0.26 |

As shown in Table 1, the element of Example 1 had nonlinearity (V10 kA/V1 mA) of 1.760, and exhibited good nonlinear resistance characteristics. In addition, the Watt loss value was also 0.74, indicating good thermal stability at a practical level. On the other hand, in the element of Comparative Example 2 in which neither tin oxide nor antimony oxide was added, both the nonlinearity (V10 kA/V1 mA) and the Watt loss value were significantly high, indicating that the element was inferior in performance.

As shown in Table 2, in the element of Example 1 in which tin oxide was used instead of antimony oxide, the σ/D of the zinc oxide particles was 0.26, and a value of σ/D comparable to that of the element of Comparative Example 1 in which antimony oxide was used was shown. On the other hand, in the element of Comparative Example 2, since neither tin oxide nor antimony oxide was present and the grain growth suppressing effect was not present, σ/D was 0.91, and the variation in zinc oxide particles was large. From this, it can be seen that in the element of Comparative Example 2, the current distribution in the element was non-uniform, and the nonlinear resistance characteristics were significantly deteriorated (Table 1, Table 2).

Figure 2:
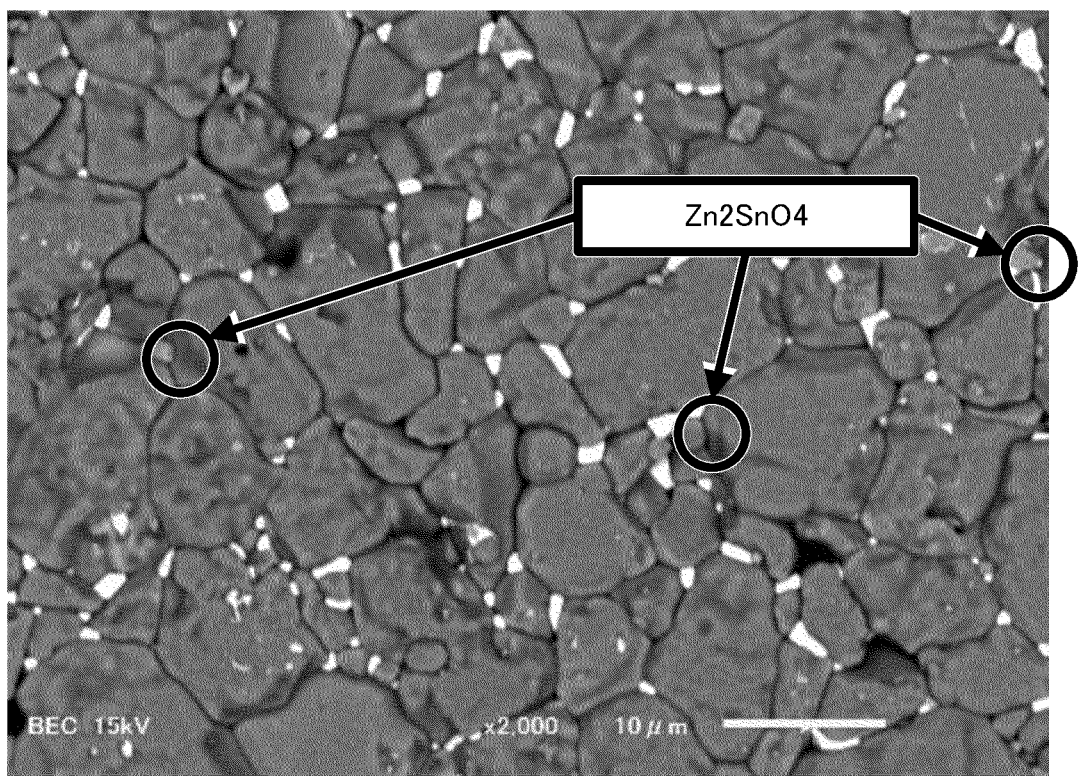
FIG. 2 is a scanning electron micrograph showing a cross section of a fired body of the zinc oxide element of the present invention to which tin oxide is added.
Figure 3:
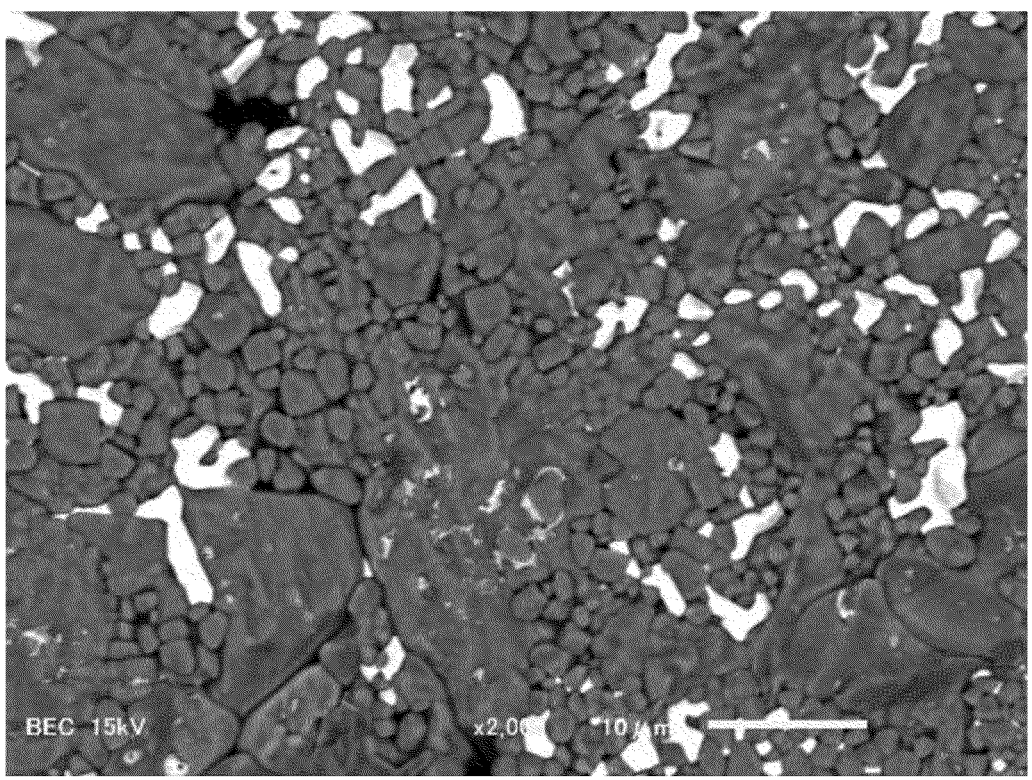
FIG. 3 is a scanning electron micrograph showing a cross section of a fired body of a zinc oxide element of Comparative Example to which neither tin oxide nor antimony oxide is added.

FIG. 2 shows a cross section of a fired body of Example 1 in which tin oxide was added instead of antimony oxide, and FIG. 3 shows a cross section of a fired body of Comparative Example 2 in which neither tin oxide nor antimony oxide was added. In FIG. 2, particles of zinc stannate ($Zn_2SnO_4$) were observed to be segregated at the grain boundaries of zinc oxide (indicated by arrows). Also, in the X-ray diffraction graph (FIG. 4) obtained by measuring the fired body of Example 1 as a sample, diffraction peaks characteristic of zinc stannate were observed in the vicinity of 29.4° and 36.0°. As a result, it was confirmed that zinc stannate was produced in the fired body.

REFERENCE SIGNS LIST

1 Zinc oxide element
11 Fired body
12 Electrode
13 Side surface insulating layer

The invention claimed is:

1. A zinc oxide element comprising a fired body containing 90 to 99.4 mol % zinc oxide, 0.3 to 1 mol % bismuth oxide, and 0.1 to 5 mol % zinc stannate ($Zn_2SnO_4$), and
in an arbitrary cross section of the fired body, a value obtained by dividing a standard deviation (σ) based on a distribution of cross-sectional areas of zinc oxide particles by an average particle diameter (D) of the zinc oxide particles (σ/D) is 0.4 or less, wherein the total amount of metal elements in the fired body is 100 mol %.

2. The zinc oxide element according to claim 1, wherein the fired body further contains 0.1 to 5 mol % tin oxide.

3. The zinc oxide element according to claim 1, wherein the fired body does not contain antimony oxide.

4. The zinc oxide element according to claim 1, wherein the fired body further contains at least one oxide compound selected from the group consisting of cobalt oxide (III), nickel oxide (II), manganese oxide (II), chromium oxide (III), silver oxide, silicon oxide, and boron oxide and wherein the at least one oxide compound is present in an amount of 0.01 to 7.0 mol %.

5. The zinc oxide element according to claim 1, wherein the fired body further contains an oxide of at least one rare earth element selected from the group consisting of yttrium, europium, erbium, thulium, gadolinium, dysprosium, holmium, and ytterbium and wherein the oxide of at least one rare earth element is present in an amount of 0.01 to 5 mol %.

6. A method for producing a zinc oxide element, comprising firing a raw material oxide that contains 90 to 99.4 mol % zinc oxide, 0.3 to 1 mol % bismuth oxide, and 0.1 to 5 mol % tin oxide and does not contain antimony oxide, and segregating zinc stannate ($Zn_2SnO_4$) at grain boundaries of the fired zinc oxide during the firing, wherein the total amount of metal elements in the fired body is 100 mol % and wherein the firing is at a maximum holding temperature of 1000 to 1200° C., a holding time of 1 to 15 hours, a temperature raising rate of 10 to 70° C./hour, and a temperature lowering rate of 10 to 70° C./hour.

7. The production method according to claim 6, wherein the raw material oxide further contains at least one oxide compound selected from the group consisting of cobalt oxide (III), nickel oxide (II), manganese oxide (II), chromium oxide (III), silver oxide, silicon oxide, and boron oxide and wherein the at least one oxide compound is present in an amount of 0.01 to 7.0 mol %.

8. The production method according to claim 6, wherein the raw material oxide further contains an oxide of at least one rare earth element selected from the group consisting of yttrium, europium, erbium, thulium, gadolinium, dysprosium, holmium, and ytterbium and wherein the oxide of at least one rare earth element is present in an amount of 0.01 to 5 mol %.

* * * * *